United States Patent
Zhang et al.

(10) Patent No.: US 12,149,548 B2
(45) Date of Patent: Nov. 19, 2024

(54) SASE BASED METHOD OF PREVENTING EXHAUSTING ATTACK IN WIRELESS MESH NETWORKS

(71) Applicant: Cisco Technology, Inc., San Jose, CA (US)

(72) Inventors: Lele Zhang, Shanghai (CN); Li Zhao, Shanghai (CN); Chuanwei Li, Shanghai (CN); Feiliang Wang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 17/515,014

(22) Filed: Oct. 29, 2021

(65) Prior Publication Data
US 2023/0139002 A1    May 4, 2023

(51) Int. Cl.
*H04L 9/40* (2022.01)
*G06F 18/214* (2023.01)
(Continued)

(52) U.S. Cl.
CPC ........ *H04L 63/1425* (2013.01); *G06F 18/214* (2023.01); *G06N 20/00* (2019.01);
(Continued)

(58) Field of Classification Search
CPC . H04L 63/14; H04L 63/1408; H04L 63/1425; H04L 63/1416; H04L 63/1441;
(Continued)

(56) References Cited

U.S. PATENT DOCUMENTS 7,818,805 B2 * 10/2010 Lloyd .................. H04L 47/822
                                                          713/153
10,931,692 B1    2/2021 Mota et al.
(Continued)

FOREIGN PATENT DOCUMENTS

CN    110830469 A  *  2/2020    ......... H04L 63/1425
EP    1839188 B1     8/2018

OTHER PUBLICATIONS

Software Defined Field Area Network (SD-FAN) forIndustrial Internet-of-Things (IIoT); https://innovationchallenge.cisco.com/itonics_idea/5698/details.
(Continued)

*Primary Examiner* — Shaqueal D Wade-Wright
(74) *Attorney, Agent, or Firm* — Polsinelli P.C.

(57) ABSTRACT

The present disclosure provides a hierarchical method of identifying unauthorized network traffic in a network by applying, at one of a first plurality of nodes of a network, a first level of network traffic analysis to identify received network traffic as one of authorized or suspicious network traffic, the one of the first plurality of nodes having a first path for traffic routing and a second path to one of a second plurality of nodes of the network, the second path being used for forwarding the suspicious network traffic to the one of the second plurality of nodes; tagging the received network traffic as the suspicious network traffic; and sending the suspicious network traffic to the one of the second plurality of nodes over the second path, the second network node applying a second level of network analysis to determine if the received network traffic is authorized, unauthorized or remains suspicious.

20 Claims, 9 Drawing Sheets

(51) Int. Cl.
  *G06N 20/00* (2019.01)
  *H04L 45/00* (2022.01)
  *H04L 45/02* (2022.01)
  *H04W 12/121* (2021.01)
  *H04W 12/00* (2021.01)

(52) U.S. Cl.
  CPC .............. *H04L 45/02* (2013.01); *H04L 45/20* (2013.01); *H04L 63/0227* (2013.01); *H04L 63/0236* (2013.01); *H04L 63/1408* (2013.01); *H04L 63/1416* (2013.01); *H04L 63/20* (2013.01); *H04W 12/121* (2021.01); *H04W 12/009* (2019.01)

(58) Field of Classification Search
  CPC . H04L 63/1458; H04L 63/1483; H04L 63/12; H04L 63/126; H04L 63/18; H04L 63/20; H04L 63/0236; H04L 63/0227; H04W 12/102; H04W 12/12; H04W 12/121; G06F 18/24; G06N 20/00
  See application file for complete search history.

(56) References Cited

U.S. PATENT DOCUMENTS

| | | |
|---|---|---|
| 10,972,508 B1 | 4/2021 | Dods |
| 2007/0097976 A1 | 5/2007 | Wood et al. |
| 2012/0311664 A1 | 12/2012 | Elrod et al. |
| 2014/0226525 A1* | 8/2014 | Eastlake, III ........... H04L 41/12 370/254 |
| 2015/0319078 A1* | 11/2015 | Lee .......... H04L 45/12 370/392 |
| 2016/0037434 A1* | 2/2016 | Gopal ................. H04B 7/1851 370/316 |
| 2018/0278648 A1 | 9/2018 | Li et al. |
| 2019/0394237 A1 | 12/2019 | Saklikar et al. |
| 2021/0176639 A1* | 6/2021 | Duo ....................... G06F 21/56 |
| 2022/0060448 A1* | 2/2022 | White ................ H04L 63/0263 |

OTHER PUBLICATIONS

International Search Report and Written Opinion for PCT Application No. PCT/US2022/078887, mailed on Jan. 30, 2023, 19 pages.
Flauzac Olivier, et al., "SDN Based Architecture for IoT and Improvement of the Security," IEEE 29th International Conference on Advanced Information Networking and Applications Workshops, Mar. 24, 2015, pp. 688-693, XP032771598, DOI: 10.1109/WAINA.2015.110 [retrieved on Apr. 27, 2015].
Maccari L, et al., "Mesh Network Firewalling with Bloom Filters," Proceedingsof the 2007 IEEE IInternational Conference on Communications (ICC 2007), Jun. 24-28, 2007, Glasgow, UK, IEEE, Piscataway, NJ, USA, Jun. 1, 2007, pp. 1546-1551, XP031125892, ISBN: 978-1-4244-0353-0.

* cited by examiner

SASE BASED METHOD OF PREVENTING EXHAUSTING ATTACK IN WIRELESS MESH NETWORKS

TECHNICAL FIELD

The present technology pertains to addressing security of wireless mesh networks, and in particular to a hierarchical scheme for applying network traffic filtering policies to detect and distinguish suspicious and/or unauthorized network traffic from authorized network traffic in a wireless mesh network formed in part of nodes with limited processing capacities.

BACKGROUND

Current mesh networks are developed for Internet of Things devices and applications. For example, smart grids in Advanced Metering Infrastructure (AMI) networks and distribution automation (DA) gateways in networks have been developed. Additionally, Wireless Smart Utility Networks (Wi-SUN) alliance network standards have been developed for integration in current wireless networks. Wi-SUN compliant networks can promote interoperable wireless standards-based solutions for Internet of Things (IOT) devices.

A typical mesh network may be formed of tens, hundreds, or thousands of nodes (e.g., IoT devices, sensors, etc.) and one or more border routers. This mesh network may be referred to as a Personal Area Network (PAN), a Field Area Network (FAN), etc. The boarder router may be a gateway for routing outbound network traffic to external network destinations including an Aggregation Service Router (ASR), nodes on other mesh networks, etc. Each node may have a unique address and can communicate with other nodes in the same or different mesh network. Dynamic routing protocol may be applied between a border router and the ASR for forwarding network traffic.

DETAILED DESCRIPTION

Figure 1A:
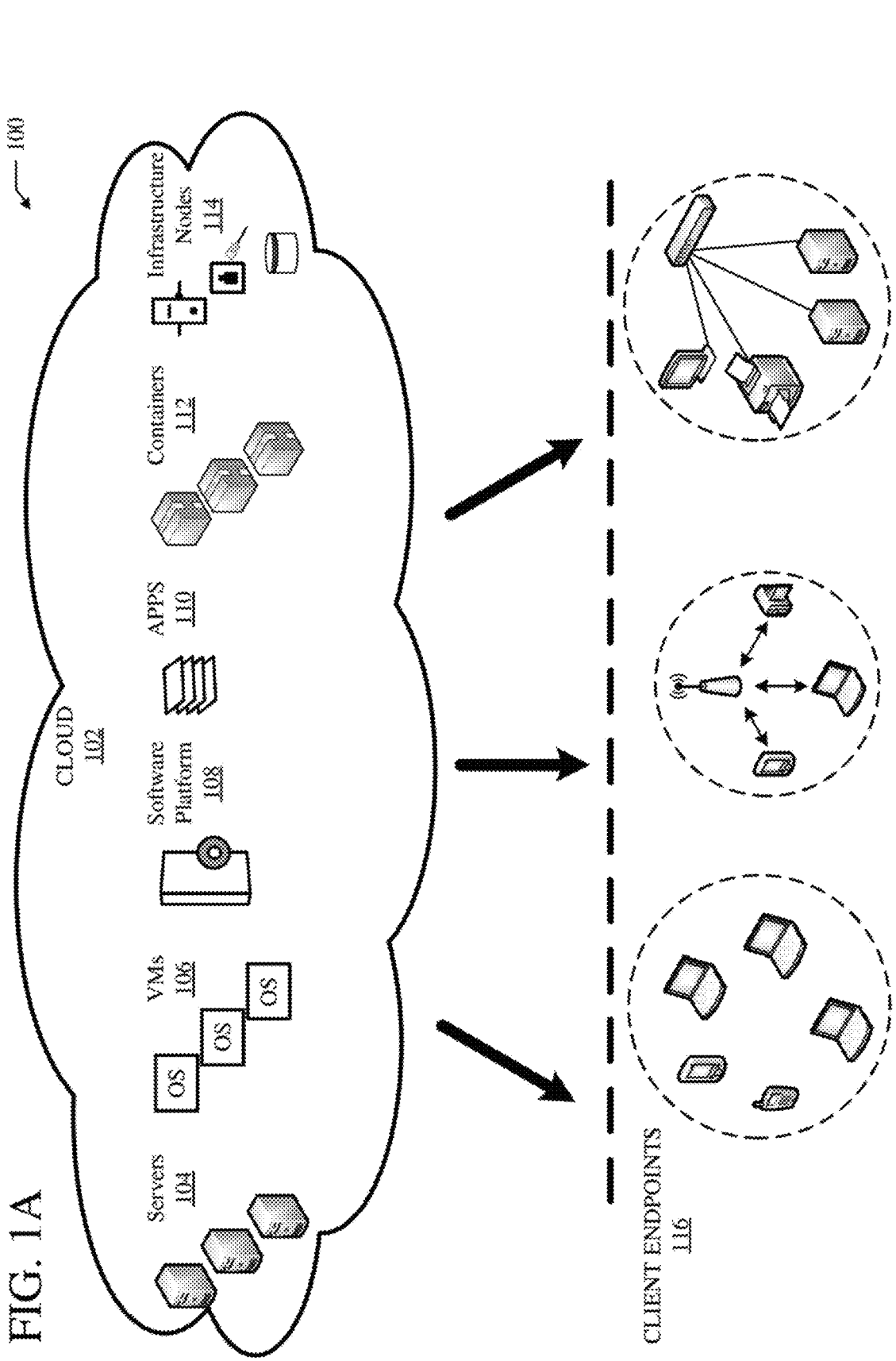
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Systems, methods, and computer-readable media are disclosed for a hierarchical scheme of applying network traffic filtering policies of different complexities at different nodes in a mesh network having different processing capacities.

Application of the disclosed hierarchical scheme can optimize consumption of network resources and bandwidth for routing the network traffic.

In one aspect, a hierarchical method of identifying unauthorized network traffic includes applying, at one of a first plurality of nodes of a network, a first level of network traffic analysis to identify received network traffic as one of authorized or suspicious network traffic, the one of the first plurality of nodes having a first path for traffic routing and a second path to one of a second plurality of nodes of the network, the second path being used for forwarding the suspicious network traffic to the one of the second plurality of nodes; sending, by the one of the first plurality of nodes, the received network traffic over the first path to a destination if the received network traffic is authorized; if the received network traffic is the suspicious network traffic, tagging, by the one of the first plurality of nodes, the received network traffic as the suspicious network traffic; and sending, by the one of the first plurality of nodes, the suspicious network traffic to the one of the second plurality of nodes over the second path, the second network node applying a second level of network analysis to the received network traffic to determine if the received network traffic is authorized, unauthorized or remains identified as the suspicious network traffic.

In another aspect, a wireless mesh network includes a first plurality of nodes and a second plurality of nodes. At least one of the first plurality of nodes is configured to apply a first level of network traffic analysis to identify received network traffic as one of authorized or suspicious network traffic, the one of the first plurality of nodes having a first path for traffic routing and a second path to one of a second plurality of nodes of the network, the second path being used for forwarding the suspicious network traffic to the one of the second plurality of nodes; send the received network traffic over the first path to a destination if the received network traffic is authorized; if the received network traffic is the suspicious network traffic, tag the received network traffic as the suspicious network traffic; and send the suspicious network traffic to one of the second plurality of nodes over the second path, the second network node applying a second level of network analysis to the received network traffic to determine if the received network traffic is authorized, unauthorized or remains identified as the suspicious network traffic.

An example non-transitory computer-readable storage medium having stored therein instructions which, when executed by a processor at at least one of a first plurality of nodes of a wireless mesh network, cause the processor to apply a first level of network traffic analysis to identify received network traffic as one of authorized or suspicious network traffic, the one of the first plurality of nodes having a first path for traffic routing and a second path to one of a second plurality of nodes of the network, the second path being used for forwarding the suspicious network traffic to the one of the second plurality of nodes; send the received network traffic over the first path to a destination if the received network traffic is authorized; if the received network traffic is the suspicious network traffic, tag the received network traffic as the suspicious network traffic; and send the suspicious network traffic to one of the second plurality of nodes over the second path, the second network node applying a second level of network analysis to the received network traffic to determine if the received network traffic is authorized, unauthorized or remains identified as the suspicious network traffic.

EXAMPLE EMBODIMENTS

In currently deployed wireless mesh networks such as Cisco Resilient Mesh (CR-Mesh) networks, one or more nodes of the mesh network (e.g., a wireless sensor, an IoT device, etc.) may be compromised. Such compromised node can send attack traffic with no particular destination (or unreachable destination) through the network that can easily block the mesh network's border router. For example, a mesh node can send over-flow traffic to an unreachable destination. According to Routing Protocol Language (RPL), such traffic will be forwarded to the border router of the mesh network hop by hop. Once the traffic reaches the border router, the border router will forward the traffic to an Aggregation Service Router (ASR), where the traffic will eventually be dropped. However, forwarding these types of attack traffic from the border router to the ASR will exhaust the 4G/LTE and/or 5G bandwidth of the border router through which it communicates with the ASR at the expense of using the same bandwidth for routing authorized (normal) network traffic.

One solution to this problem would be to set access policies on the border router. However, doing so introduces the following challenges. First, a border router can typically be tasked with managing hundreds or thousands (e.g., 5000) of nodes in a mesh network (e.g., IoT devices, sensors, etc.). Utilizing the processing capacity of such border router to process network traffic by applying such access policies can limit the capacity of the border router for processing authorized network traffic to and from the managed nodes in the mesh network. Second, implementing such access policies at a border router would be complex given the large number of nodes managed by the border router. Third, applying such access policies to deal with unauthorized traffic from a compromised node can still exhaust intermediary network resources and bandwidth as this traffic is forwarded hop by hop through the mesh network until it reaches the border router.

The present disclosure addresses these problems by proposing an integration of a Software-Defined Field Area Network (SD-FAN, which is a cloud-based network), distributed fog computing, and network security into an IoT Secure Access Service Edge (SASE) solution. More specifically, the proposed solution of the present disclosure includes deployment of fog devices (e.g., edge routers) in wireless mesh networks (which may also be referred to as Low Power and Lossy Networks (LLNs). These fog devices can have more processing capacities that mesh nodes with limited processing capacities (e.g., nodes such as IoT devices, sensors, etc.). Multiple routing paths may be defined by the SD-FAN for the mesh nodes. Simple filtering policies may be configured on the mesh nodes for distinguishing between authorized (normal) and suspicious network traffic. Authorized network traffic may then be forwarded hop by hop over one defined path to its intended destination (e.g., hop by hop to the border router and eventually to the ASR) while malicious network traffic are tagged and forwarded over another defined path to the nearest fog device. The fog device can then apply more complex processing on the received suspicious network traffic to determine if the received network traffic is indeed malicious (should be dropped), authorized or still remains suspicious (indicating that the fog device is also unable to identify the network traffic as either authorized or malicious). Authorized and still suspicious network traffic are sent from the fog device to the border router for either normal processing or further analysis at the ASR or SD- FAN. Accordingly, the present disclosure provides a hierarchical scheme of applying network traffic filtering policies of different complexities at different nodes in a mesh network to optimize the use of network resources and bandwidth for routing the network traffic.

Figure 1B:
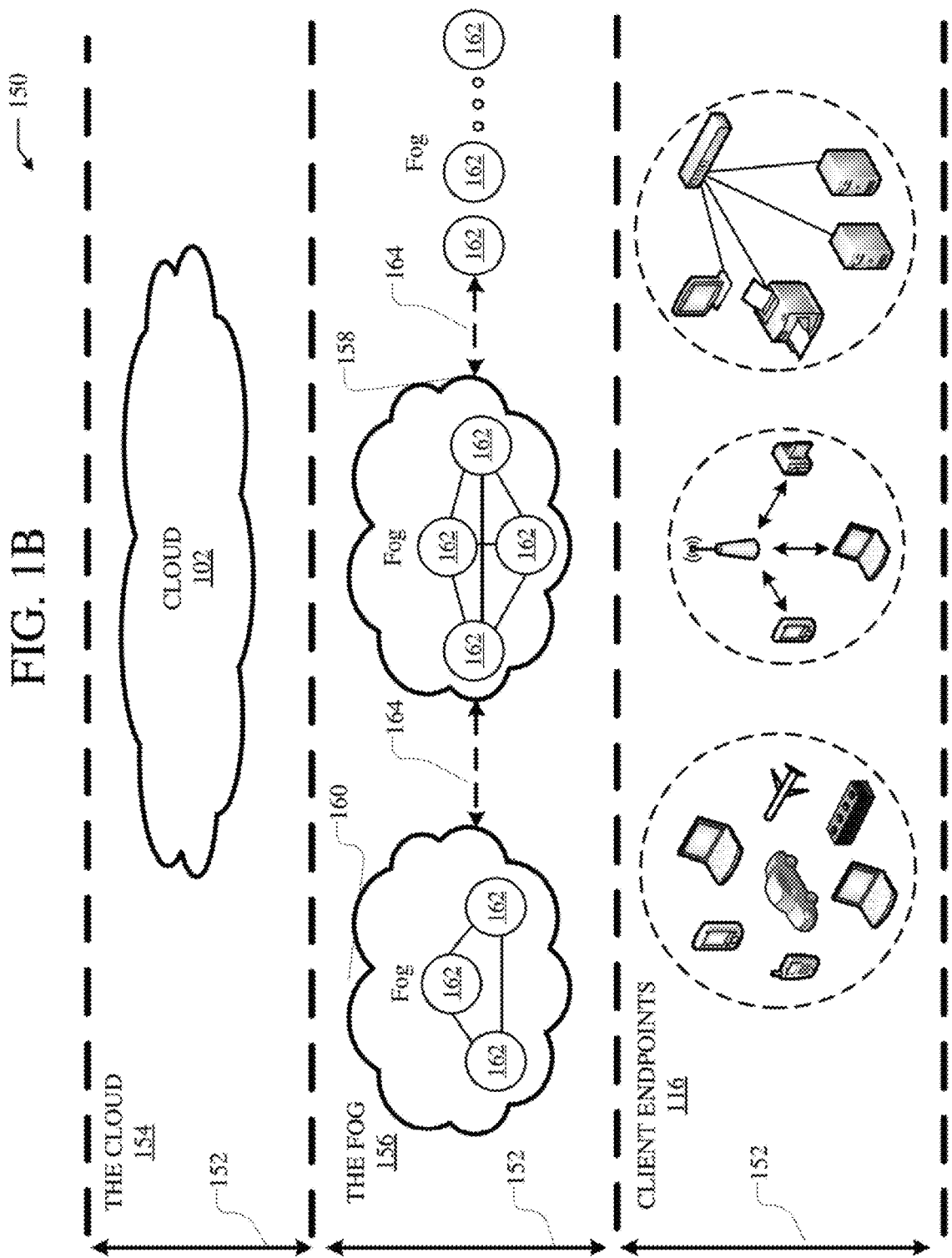
FIG. 1B illustrates an example fog computing architecture.
Figure 2:
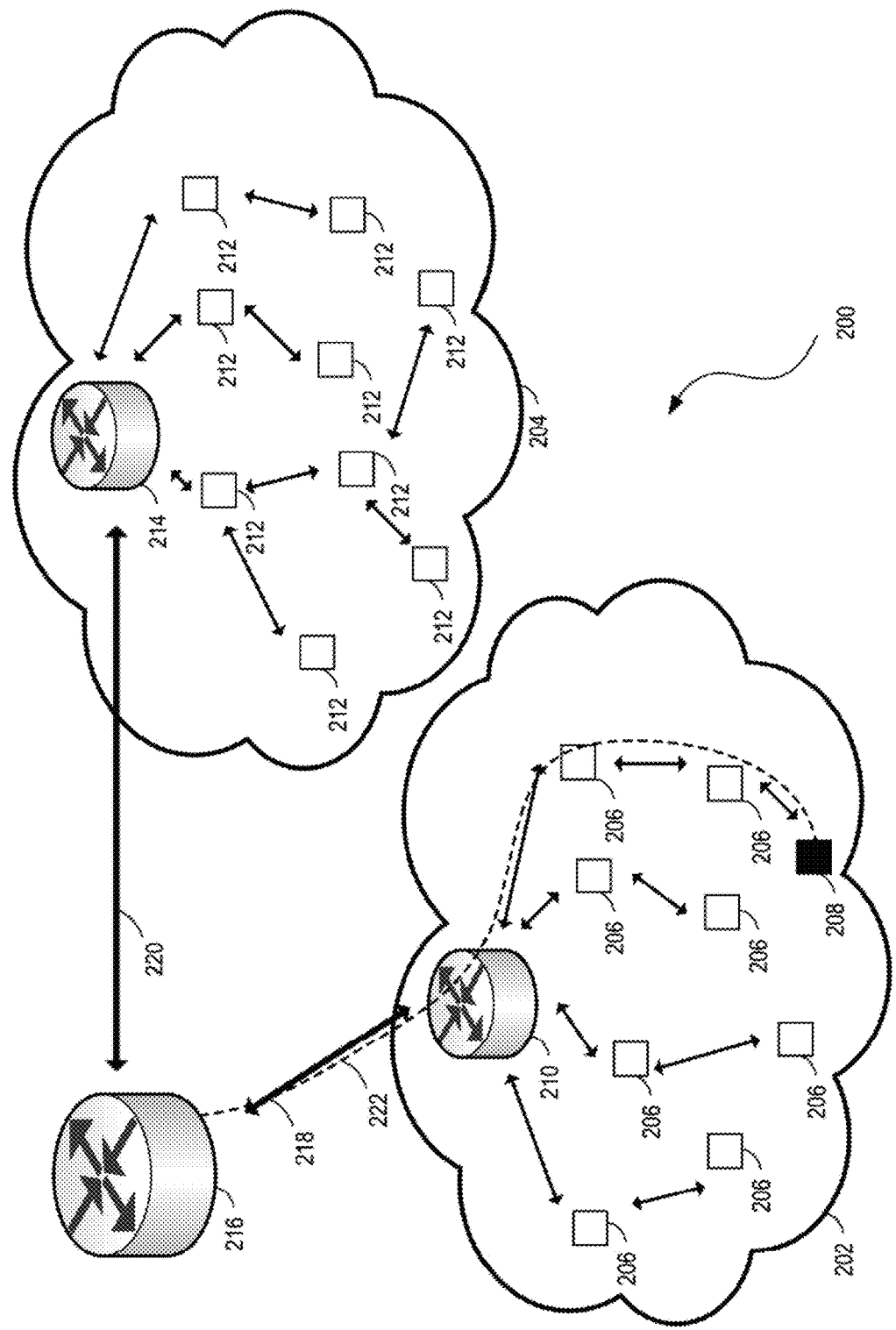
FIG. 2 illustrates example wireless mesh networks, according to some aspects of the present disclosure.
Figure 3:
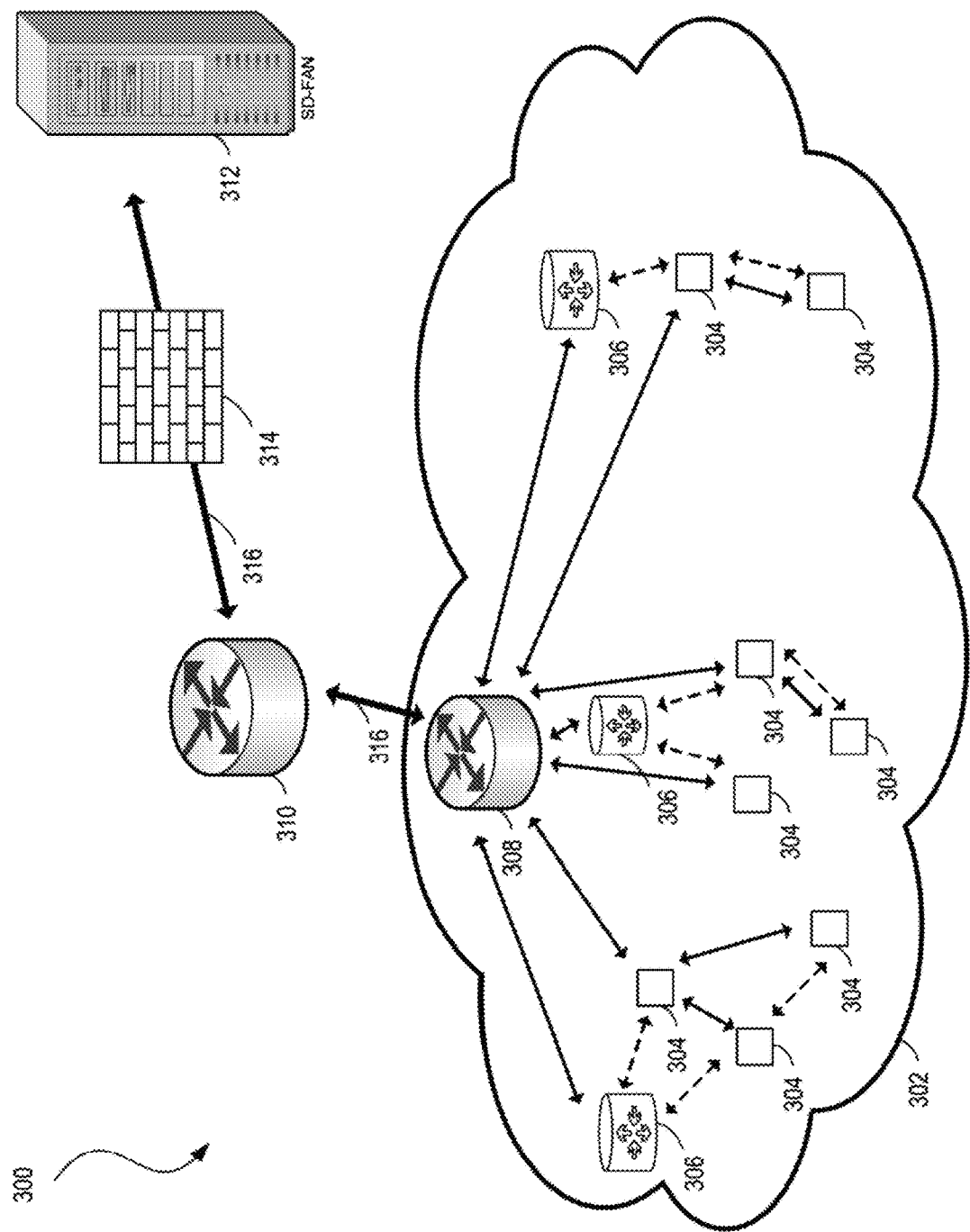
FIG. 3 illustrates an example SASE based architecture for applying hierarchical network traffic filtering policies in a wireless mesh network, according to some aspects of the present disclosure.
Figure 7:
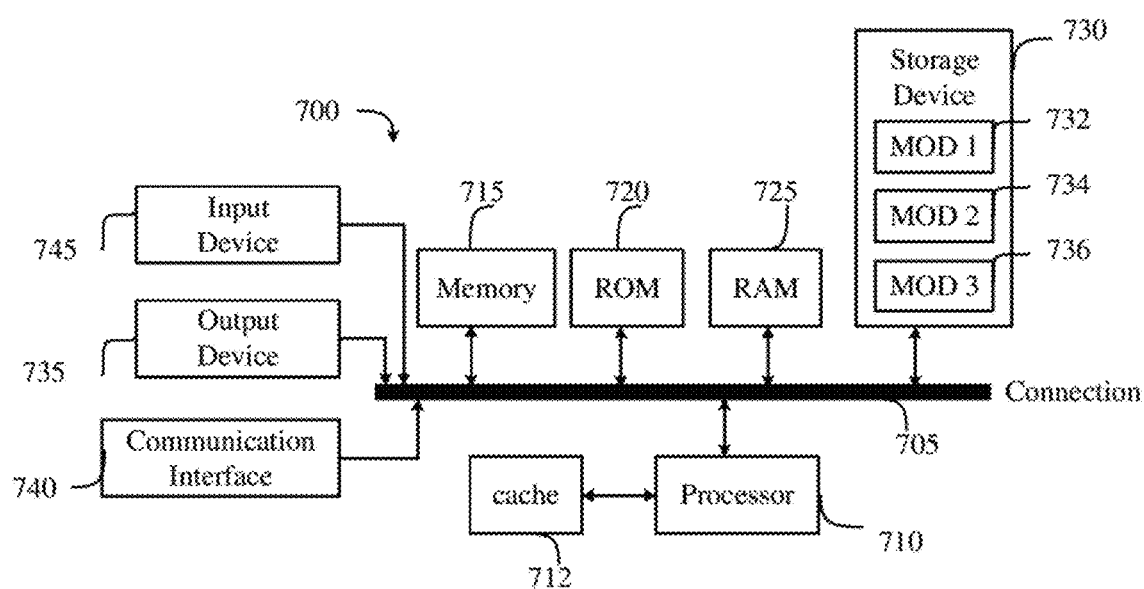
FIG. 7 illustrates a computing system architecture, according to some aspects of the present disclosure.
Figure 8:
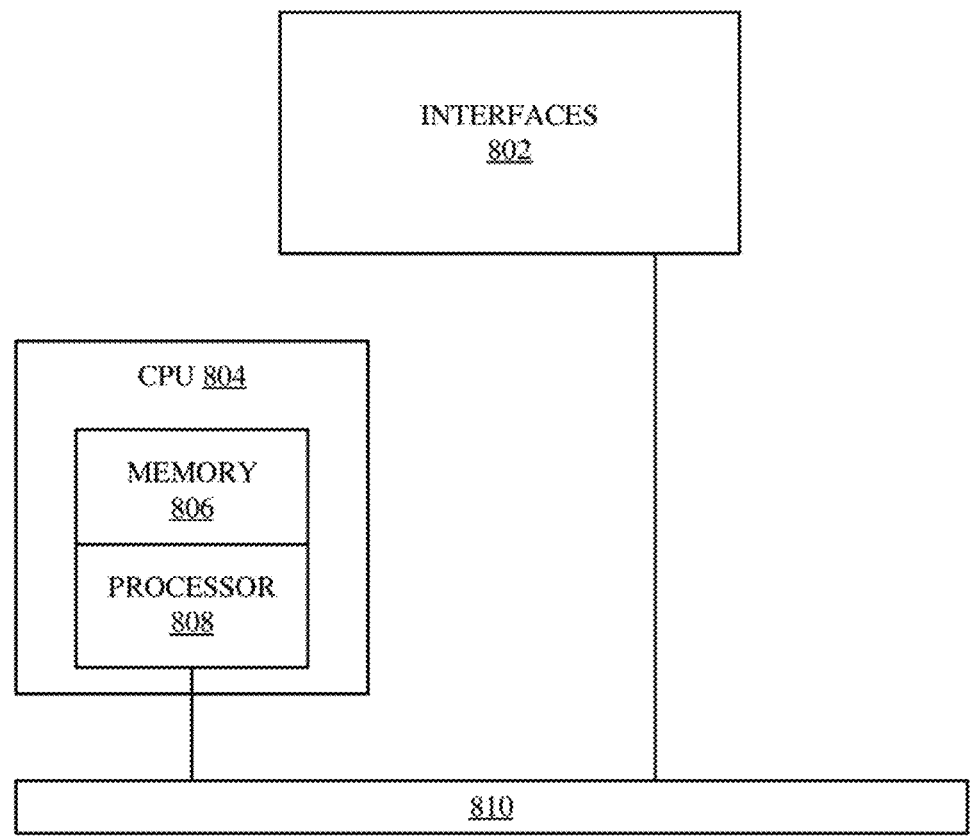
FIG. 8 illustrates an example network device, according to some aspects of the present disclosure.

A description of example network environments and architectures for network data access and services, as illustrated in FIGS. 1A, and 1B, is first disclosed herein. A description of example wireless mesh networks with reference to FIG. 2 is described next. A description of a SASE based architecture for applying hierarchical network traffic filtering policies in a wireless mesh network with reference to FIG. 3 is described next followed by example processes for applying hierarchical network traffic filtering policies with reference to FIGS. 4 and 5. A neural network architecture that may be trained for dynamically updating filtering policies and rules is described with reference to FIG. 6. The discussion then concludes with a brief description of example devices, as illustrated in FIGS. 7 and 8. These variations shall be described herein as the various embodiments are set forth.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network (s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 illustrates example wireless mesh networks, according to some aspects of the present disclosure.

As shown in FIG. 2, environment 200 is formed of two wireless mesh networks 202 and 204. Wireless mesh networks 202 and/or 204 can each be a CR-Mesh described above. Wireless mesh network 202 can include any number of nodes such as nodes 206. Nodes 206 can be the same as client endpoints 116 of FIG. 1B, can be an IoT device used in various applications such as AMI devices, DA gateways, sensors, etc. Wireless mesh network 202 can further include a node 208. Node 208 is numbered differently that other nodes 206 to indicate that node 208 is an example of a compromised node from which unauthorized attack traffic may originate. Otherwise, node 208 can be the same as any one of nodes 206. Wireless mesh network 202 further includes a border router 210. Border router 210 can be any known or to be developed border router such as CGR1K router developed by Cisco Inc., of San Jose, CA.

Similar to wireless mesh network 202, wireless mesh network 204 may include a number of nodes 212 that may be the same as any one of the nodes 206 of wireless network 202. Wireless mesh network 204 can also include a border router 214 that may be the same as border router 210 of wireless mesh network 202. While FIG. 2 illustrates two example wireless mesh networks 202 and 204, the present disclosure is not limited thereto and environment 200 can include more than two or just one wireless mesh network.

Environment 200 further includes ASR 216 that may be remotely located relative to wireless mesh networks 202 and 204 and thus communicatively coupled to border routers 210 and 214. The communication (link) 218 between ASR 216 and border router 210 may be a cellular based wireless link such as a 4G/LTE or a 5G link. Similarly, the communication (link) 220 between ASR 216 and border router 214 may be a cellular based wireless link such as a 4G/LTE or a 5G link.

Within each of wireless mesh networks 202 and 204, traffic originating from any of the nodes 206, 208, and/or 212 may be routed hop by hop through other nodes connected thereto, until the network traffic reaches the corresponding one of border routers 210 or 214. Such traffic may then be forwarded by the corresponding border router 210 or 214 to ASR 216, where the destination of the network traffic may be identified (e.g., if the destination is a node in the other one of wireless mesh networks 202 and 204) and routed accordingly to the destination.

However, as illustrated in FIG. 2, any one of nodes in wireless mesh networks 202 and 204 may be compromised. For example, node 208 may be a compromised node. Network traffic initiating from a compromised node may have an unreachable destination. Such network traffic may traverse hop by hop along example path 222 (dotted line 222) to eventually reach border router 210 and subsequently ASR 216, where the traffic, which is unauthorized, may be dropped. This traversal, as described above, consumes network resources and bandwidth, including the cellular bandwidth (e.g., 4G/LTE, 5G, etc.) of the link 218 between border router 210 and ASR 216. As described above, the present disclosure presents a SASE based architecture that utilizes fog devices inside wireless mesh networks to apply a hierarchical process for applying network traffic filtering policies to network traffic in a wireless mesh network, thus minimizing resource and bandwidth consumption for routing unauthorized network traffic to and from compromised node(s).

FIG. 3 illustrates an example SASE based architecture for applying hierarchical network traffic filtering policies in a wireless mesh network, according to some aspects of the present disclosure.

Compared to environment 200 of FIG. 2, SASE based environment 300 of FIG. 3 illustrates a single wireless mesh network 302 for ease of discussion. However, environment 300 can include more than one wireless mesh network. Wireless mesh network 302 can include a number of nodes 304, which may be the same as nodes 206, 208 and 212 of FIG. 2. Nodes 304 may be referred to as a first plurality of nodes to distinguish them from a different set of nodes of wireless mesh network 302, namely fog devices 306 that may be referred to as a second plurality of nodes.

Fog devices 306 may be any type of known or to be developed fog device such as fog nodes 162 at fog layer 156 of FIG. 1B. An edge router is an example of a fog device.

Wireless mesh network 302 can further include a border router 308, which may be the same as border router 210 or 212 of FIG. 2 and hence will not be further described. Border router 310 may be connected using a cellular link 316 (e.g., a 4G/LTE and/or a 5G link) to ASR 310, which may be the same as ASR 216 of FIG. 1 and hence will not be further described. A similar cellular link 316 may also be used for connecting ASR 310 to SD-FAN 312.

SASE environment 300 further includes an SD-FAN controller 312 residing in a cloud that may be communicatively coupled to ASR 310 through firewall 314. SD-FAN controller 312 can be any type of known or to be developed cloud-based controller residing on one of servers 104 of FIG. 1A. SD-FAN controller may be referred to as SD controller, a network controller, or simply a controller.

As shown in FIG. 3 and within wireless mesh network 302, there are two types of paths configured for nodes 304 and 306. The first type of path (shown using solid lines in FIG. 3) are the shortest paths (whether single-hop or multi-hop) between each one of nodes 304 (first plurality of nodes) and border router 308 or between each one of fog devices 306 (second plurality of nodes) and border router 308. The second type of path (shown using dashed lines in FIG. 3) is the shortest path from each one of nodes 304 to the nearest fog device 306.

In some examples, first and second types of paths may be dynamically determined by SD-FAN controller 312. Nodes 304/306 may then be configured with these paths. Furthermore, as nodes are added or dropped from wireless mesh network 302, SD-FAN controller 312 may dynamically recalculate/update the first and second types of paths for the nodes of wireless mesh network 302 and configure existing and/or newly added node(s) 304 and/or node(s) 306 with the updated first and second types of paths.

Figure 4:
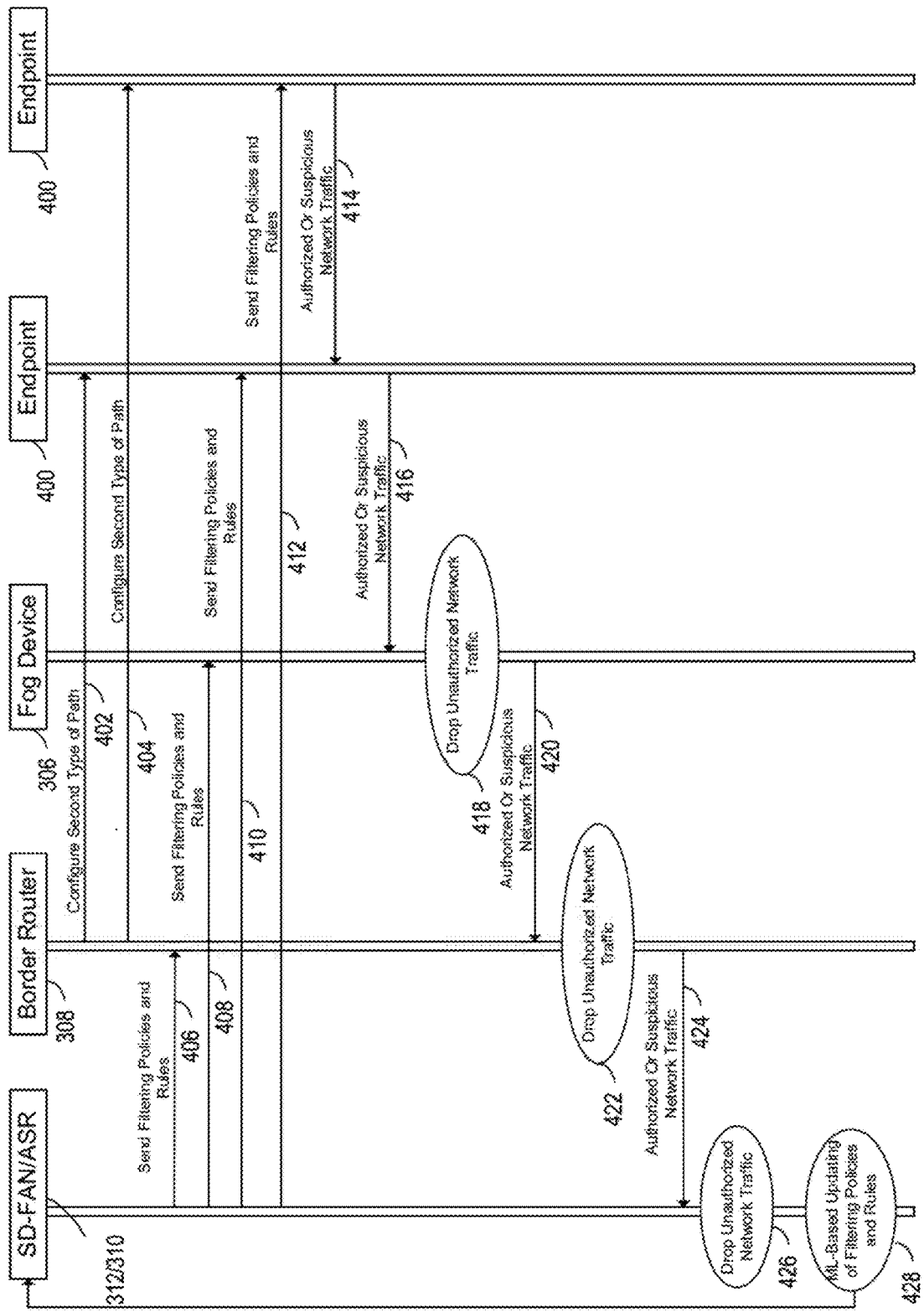
FIG. 4 illustrates an example process of configuring and applying hierarchical network traffic filtering policies in a wireless mesh network, according to some aspects of the present disclosure.

FIG. 4 illustrates an example process of configuring and applying hierarchical network traffic filtering policies in a wireless mesh network, according to some aspects of the present disclosure. The example process of FIG. 4 is described with reference to SD-FAN/ASR 312/310, border router 308, fog device 306 and two example nodes 304 of FIG. 3 (identified as endpoints 400 in FIG. 4). In other words, endpoints 400 are the same as nodes 304 (first plurality of nodes) described above with reference to FIG. 3.

As shown in FIG. 4, at steps 402 and 404, border router 308 may configure nodes 400 (first plurality of nodes) with second paths (i.e., their respective shortest path to their respective nearest fog device 306). Nodes 400 may have previously been configured with the first paths (i.e., their respective shortest path to border router 308).

At steps 406, 408, 410, and 412 simple filtering policies for distinguishing between normal and suspicious network traffic are sent from SD-FAN 312, via ASR 310, to border router 308, fog device 306 and endpoints 400, respectively. Authorized network traffic may refer to data packets of traffic initiating from and/or destinated for an authorized (uncompromised) node of wireless mesh network 302. A suspicious network traffic is any other type of network traffic that is not authorized. As noted above, filtering policies may be determined and set by SD-FAN 312 and can include simple and more complex policies. Endpoints 400 may be configured with simple filtering policies due to their more limited processing capacities such that they may only distinguish between authorized network traffic and suspicious network traffic. Nodes with more processing capacities such as fog device 306 and border router 308 may be configured with more complex filtering policies and rules such that fog device 306 and/or border router 308 can process network traffic, identified and tagged as suspicious by an endpoint 400, to determine whether the suspicious network traffic is indeed authorized, and if not whether it is malicious and should be dropped. If such fog device 306 or border router 308 is still unable to determine whether a suspicious network traffic is authorized or unauthorized such that it should be dropped, the suspicious network traffic is router again to ASR 310 and/or SD-FAN 312 for final determination of whether it is authorized or not and if not, whether the network traffic should be dropped or not.

In other words, endpoints 400 may be configured with the simplest filtering policies and rules, fog device 306 may be configured with more complex filtering policies and rules relative to endpoints 400, border router 308 may be configured with the same complex filtering policies and rules as fog device 306 (e.g., border router 308 may operate as another fog device 306 for network traffic filtering) or alternatively may be configured with more complex filtering policies and rules relative to fog device 306, and ultimately, ASR 310 and SD-FAN 312 may be configured with the most complex filtering policies and rules relative to endpoints 400, fog device 306, and border router 308 such that any network traffic that endpoints 400, fog device 306, and/or border router 308 are unable to identify as either authorized or unauthorized, can be identified as one such type of traffic at ASR 310 and/or SD-FAN 312.

Examples of simple rules with which endpoints 400 may be configured include, but are not limited to, filtering based on source MAC address or IPv6 address, destination MAC address or IPv6 address, User Defined Protocol (UDP) port, time slot (e.g., from 2 am to 8 am, no network traffic should be received from a particular node and if received, should be considered suspicious), throughput threshold (e.g., it is acceptable to receive at most 20 packets per minute from a particular node and if more packets are received (e.g., 500 packets in ten minutes), then this network traffic should be considered suspicious).

Examples of more complex rules with which fog/edge devices such as fog device 306 and/or border router 308 may be configured to distinguish between authorized and unauthorized network traffic include, but are not limited to, source & destination address, traffic size, retransmission times, suspicious connection, etc.

With regard to source and destination address, the rule may be that each packet must carry one or both addresses while forwarding network traffic. The fog device 306 and/or border router 308 may have knowledge of routing details such that any traffic carrying unknown or fake addresses can be detected and identified as unauthorized network traffic.

With regard to traffic size, the fog device 306 and/or border router 308 can detect a sudden and rapid increase in the size of the incoming traffic over a short period of time when such increase is not expected. This can be indicative of unauthorized network traffic.

With regard to retransmission times, which may typically be less in a PAN, fog device 306 and/or border router 308 may detect too many retransmissions over a period of time. This can be indicative of unauthorized network traffic.

With regard to suspicious connections, it may be the case, considering network routing topology or network secure configurations, that some devices (e.g., some of endpoints 304 or 400) are not connectable. Therefore, if fog device 306 and/or border router 308 detects that such "unconnectable" devices are exchanging data, fog device 306 and/or border router 308 can flag the network traffic from such devices as unauthorized.

As noted above, rules with which fog device 306 are configured may be less complex than rules with which border router 308 may be configured or they may be the same. In case of rules at fog device 306 and border router 308 being different, some examples of more complex rules described above may be applied at fog device 306 while other ones may be applied as the next layer of complex rules at border router 308, should fog device 306 be unable to make a determination as to whether the network traffic received is authorized or not, using the rules with which fog device 306 is configured.

In some cases, in order for fog device 306 and/or border router 308 to determine whether a particular instance of received network traffic is authorized or not, all rules with which fog device 306 and/or border router 308 are configured must be violated or at least a majority of them must be violated. For example, if fog device 306 is configured with source and destination address rule, traffic size rule, and retransmission times rule, at least two or sometimes all three rules must be violated for a given network traffic, in order for fog device 306 to determine that the network traffic is unauthorized and hence must be dropped. Otherwise, if only one of the rules is violated, then fog device may be unable to determine whether the network traffic is authorized or not and hence forwards the same as suspicious network traffic to either border router 308, ASR 310 or SD-FAN 312 for determining whether the received network traffic is authorized or not. Similar process may be applied at each of border router 308, ASR 310, and/or SD-FAN 312.

In a similar manner to determining whether a particular instance of received network traffic is unauthorized, all rules with which fog device 306 and/or border router 308 are configured must be verified (i.e., the network traffic must satisfy such rule(s)) or at least a majority of thereof must be verified in order to determine that the particular instance of network traffic is authorized. For example, if fog device 306 is configured with source and destination address rule, traffic size rule, and retransmission times rule, at least two or sometimes all three rules must be verified for a given network traffic, in order for fog device 306 to determine that the network traffic is authorized.

Thereafter, the appropriate filtering policies and rules are progressively applied until an incoming network traffic (i.e., data packet(s)) is identified as either authorized network traffic or unauthorized network traffic that should be dropped.

More specifically, at either one of steps 414 or 416, the respective endpoint 400 applies the corresponding (least complex) filtering policies and rules to determine if an incoming (received) network traffic is authorized or not. If authorized, the respective endpoint 400 routes the incoming network traffic over the first type of path (e.g., paths shown using solid lines in FIG. 3) to its intended destination which can be another node in the same wireless mesh network 302, a cloud based component or another node in another reachable wireless mesh network. If unauthorized, the respective endpoint 400 tags the incoming network traffic as suspicious and forwards the same to fog device 306. At step 418 and after applying the more complex filtering policies and rules, fog device 306 determines if the network traffic is authorized, unauthorized or still suspicious. If authorized, fog device 306 forwards the authorized network traffic to border router 308 to be sent to its intended destination. If unauthorized, fog device 306 drops the network traffic at step 418. If fog device 306 is still unable to identify the network traffic as either authorized or unauthorized, fog device 306 forwards, at step 420, the traffic to border router 308. The same process is then applied at border router 308, at step 422 to determine whether the network traffic is authorized, remains suspicious or is unauthorized such that it should be dropped. The filtering policies and rules applied at step 422 may be the same or more complex filtering policies or rules compared to filtering policies or rules configured at fog device 306. If border router 308 is still unable to identify the network traffic as authorized or unauthorized, then at step 424, the suspicious network traffic is forwarded to ASR 310 or SD-FAN 312 where the most complex filtering policies or rules will be applied to determine if the suspicious network traffic is authorized or not. If unauthorized, ASR 310 or SD-FAN 312 drop the network traffic at step 426. Otherwise, the network traffic will be returned back to ASR 310 to be routed to its intended destination.

Filtering policies and rules with which various nodes of the wireless mesh network may be configured, can be dynamically updated by SD-FAN 312 at step 426. This updating may be based on any number of factors including addition/removal of nodes from wireless mesh network 302, network congestion, speed, bandwidth, required Quality of Service (QoS), application specifications for which wireless mesh network 302 is utilized, etc. In some examples, one or more machine learning models (e.g., a trained neural network) may be utilized at SD-FAN 312 that based on real-time conditions can determine the most appropriate filtering policies and rules to configure different types of nodes in the wireless mesh network with.

Figure 5:
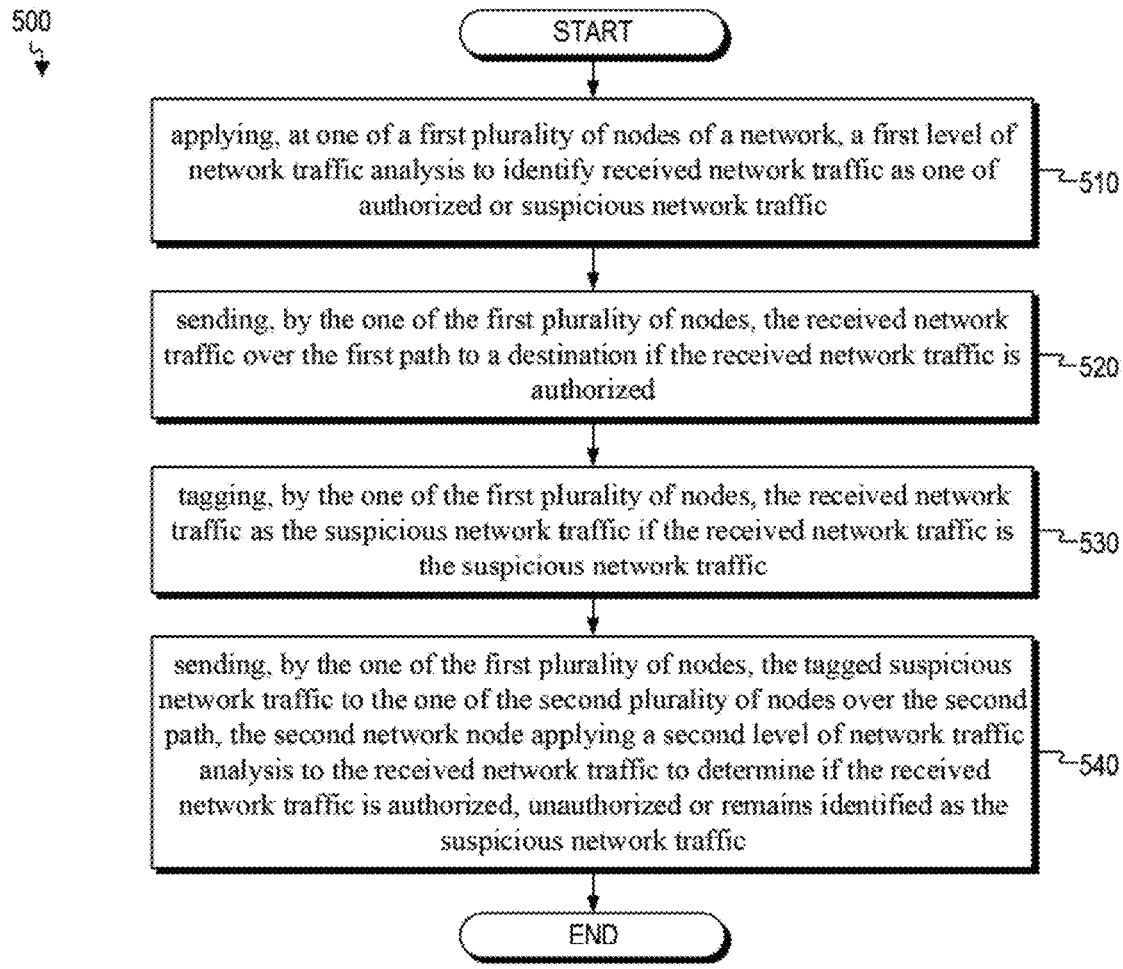
FIG. 5 illustrates an example method of applying hierarchical network traffic routing policies to a wireless mesh network, according to some aspects of the present disclosure.

FIG. 5 illustrates an example method of applying hierarchical network traffic routing policies to a wireless mesh network, according to some aspects of the present disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence. FIG. 5 will be described with reference to FIGS. 3 and 4. Lastly, example method 500 will be described from the perspective of one of the first plurality of nodes of the mesh network node (e.g., one of nodes 304/endpoints 400, etc.).

At step 510, the method includes applying, at one of a first plurality of nodes of a network (e.g., a node 304), a first level of network traffic analysis to identify received network traffic as one of authorized or suspicious network traffic, the one of the first plurality of nodes having a first path for traffic routing and a second path to one of a second plurality of nodes of the network, the second path being used for forwarding the suspicious network traffic to the one of the second plurality of nodes. The first and second paths are described above with reference to FIG. 3. In one example, at step 510, a node 304 of FIG. 3 may apply a first level of network traffic analysis. In some examples, the first set of filtering rules are lest complex set of filtering policies and rules as described above with reference to FIG. 4 (applied at steps 414 or 416). In some examples, the network (wireless mesh network 302 of FIG. 3) has a tree-based topology and is a multi-hop wireless mesh network that utilizes Routing Policy Language (RPL) for traffic routing in the network. In some examples, each of the first plurality of nodes are one or more of a sensor or an Internet of Things device such as client endpoints 116 of FIG. 1B and any one of nodes 304 of FIG. 3. In some examples, the one of the first plurality of nodes has a more limited capacity for analyzing the received network traffic compared to the one of the second plurality of nodes (e.g., one of fog devices 306, border router 308, ASR 310, and/or SD-FAN 312). In some examples, the one of the second plurality of nodes is a network fog device such as one of fog devices 306 of FIG. 3.

At step 520, the method includes sending, by the one of the first plurality of nodes, the received network traffic over the first path to a destination if the received network traffic is determined to be authorized network traffic at step 510.

At step 530, the method includes tagging, by the one of the first plurality of nodes, the received network traffic as the suspicious network traffic if the received network traffic is the suspicious network traffic. For example, if node 304 determines that the received network traffic is suspicious, node 304 may tag the received network traffic as suspicious. In one example, such tagging includes adding a new data field for every packet to mark its authorization status. This operation may be referred to as tagging data. For example, authorized network traffic may be tagged as green, suspicious network traffic may be tagged as yellow and unauthorized network traffic may be tagged as red. In this instance a numerical value may be assigned to each "color." For example, "green" may be defined as 1, "yellow" may be defined as 0, and "red" may be defined as −1. Alternatively, the colors may be defined with any different number. In some examples, authorized network traffic may not be tagged, and instead only suspicious or unauthorized network traffic may be tagged.

At step 540, the method further includes sending, by the one of the first plurality of nodes, the tagged suspicious network traffic to the one of the second plurality of nodes (e.g., fog device 306 and/or border router 308) over the second path, the second network node applying a second level of network traffic analysis to the received network traffic to determine if the received network traffic is authorized, unauthorized or remains identified as the suspicious network traffic. In some examples, the second level of network traffic analysis applies a second set of filtering rules to the received network traffic that are more complex than the first set of filtering rules applied by node 304 at step 510, as described above with reference to FIG. 4 (e.g., at steps 418 and/or 424).

In some examples, when the one of the second plurality of nodes determines that the received network traffic remains identified as the suspicious network traffic, the one of the second plurality of nodes forwards the received network traffic to one or more of an Aggregation Service Router (e.g., ASR 310) or a SD controller (e.g., SD-FAN 312) associated with the network for further processing. In some examples, the further processing determines whether the suspicious network traffic is authorized or unauthorized. Filtering policies and rules applied at ASR 310 and/or SD-FAN 312 may the most complex relative to filtering polices and rules applied at node(s) 304, fog devices 306 and/or border router 308. In some examples, the SD controller dynamically updates the first level of network traffic analysis and the second level of network traffic analysis using a trained machine learning model.

In some examples, the one of the first plurality of nodes and the one of the second plurality of nodes are configured with respective ones of the first level of network traffic analysis and the second level of network traffic analysis by the SD controller communicatively coupled to the network.

As noted above, SD-FAN 312 may dynamically update filtering policies and rules (of different complexities) to be applied at different nodes on wireless mesh network 302 and/or cloud components connected thereto such as ASR 310 or SD-FAN 312 itself. These updated filtering policies and rules may be determined by SD-FAN 312 using fully or semi-supervised machine learning modes.

Figure 6:
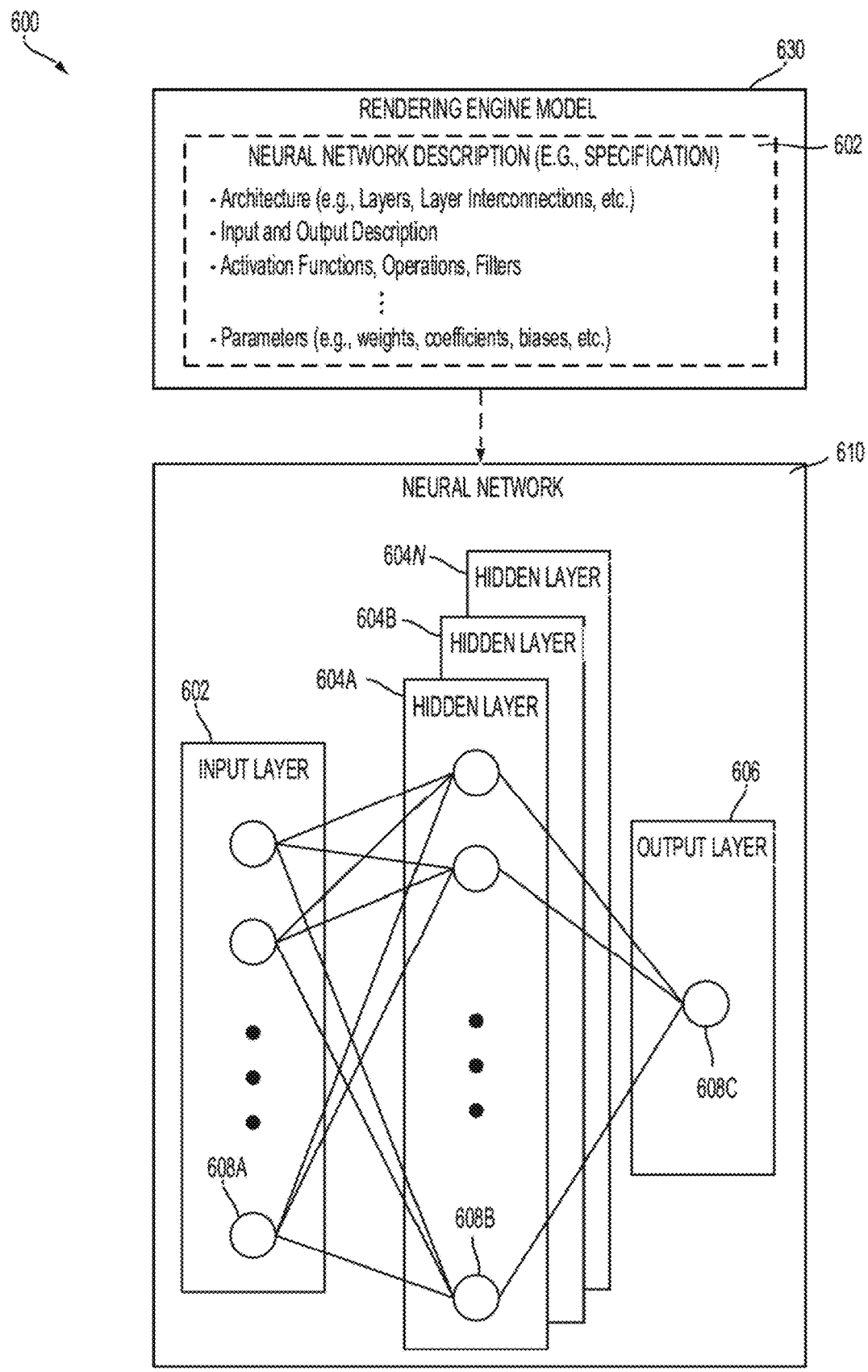
FIG. 6 illustrates an example neural network architecture that may be trained for updating network traffic filtering rules, according to some aspects of the present disclosure.

FIG. 6 illustrates an example neural network architecture that may be trained for updating network traffic filtering rules, according to some aspects of the present disclosure. Architecture 600 includes a neural network 610 defined by an example neural network description 601 in rendering engine model (neural controller) 630. The neural network 610 can represent a neural network implementation of a rendering engine for rendering media data. The neural network description 601 can include a full specification of the neural network 610, including the neural network architecture 600. For example, the neural network description 601 can include a description or specification of the architecture 600 of the neural network 610 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 610 reflects the architecture 600 defined in the neural network description 601. In this example, the neural network 610 includes an input layer 602, which includes input data, such as addition/removal of nodes from wireless mesh network 302, network congestion, speed, bandwidth, required Quality of Service (QoS), application specifications for which wireless mesh network 302 is utilized, etc. In some examples, one or more machine learning models (e.g., a trained neural network) may be utilized at SD-FAN 312 that based on real-time conditions can determine the most appropriate filtering policies and rules to configure different types of nodes in the wireless mesh network with. In one illustrative example, the input layer 602 can include data representing a portion of the input data.

The neural network 610 includes hidden layers 604A through 604N (collectively "604" hereinafter). The hidden layers 604 can include n number of hidden layers, where n is an integer greater than or equal to one. The number of hidden layers can include as many layers as needed for a desired processing outcome and/or rendering intent. The neural network 610 further includes an output layer 606 that provides an output (e.g., rendering output 800) resulting from the processing performed by the hidden layers 604. In one illustrative example, the output layer 606 can provide an identification of network traffic filtering policies and rules of varying complexities to be applied at different nodes (e.g., nodes 304, nodes 306/border router 308, ASR 310, SD-FAN 312, etc.).

The neural network 610 in this example is a multi-layer neural network of interconnected nodes. Each node can represent a piece of information. Information associated with the nodes is shared among the different layers and each layer retains information as information is processed. In some cases, the neural network 610 can include a feed-forward neural network, in which case there are no feedback connections where outputs of the neural network are fed back into itself. In other cases, the neural network 610 can include a recurrent neural network, which can have loops that allow information to be carried across nodes while reading in input.

Information can be exchanged between nodes through node-to-node interconnections between the various layers. Nodes of the input layer 602 can activate a set of nodes in the first hidden layer 604A. For example, as shown, each of the input nodes of the input layer 602 is connected to each of the nodes of the first hidden layer 604A. The nodes of the hidden layer 604A can transform the information of each input node by applying activation functions to the information. The information derived from the transformation can then be passed to and can activate the nodes of the next hidden layer (e.g., 604B), which can perform their own designated functions. Example functions include convolutional, up-sampling, data transformation, pooling, and/or any other suitable functions. The output of the hidden layer (e.g., 604B) can then activate nodes of the next hidden layer (e.g., 604N), and so on. The output of the last hidden layer can activate one or more nodes of the output layer 606, at which point an output is provided. In some cases, while nodes (e.g., nodes 608A, 608B, 608C) in the neural network 610 are shown as having multiple output lines, a node has a single output and all lines shown as being output from a node represent the same output value.

In some cases, each node or interconnection between nodes can have a weight that is a set of parameters derived from training the neural network 610. For example, an interconnection between nodes can represent a piece of information learned about the interconnected nodes. The interconnection can have a numeric weight that can be tuned (e.g., based on a training dataset), allowing the neural network 610 to be adaptive to inputs and able to learn as more data is processed.

The neural network 610 can be pre-trained to process the features from the data in the input layer 602 using the different hidden layers 604 in order to provide the output through the output layer 606. In an example in which the neural network 610 is used to determine appropriate network traffic filtering policies and rules, the neural network 610 can be trained using training data that includes example network conditions (e.g., Key Performance Indicators (KPIs) related to network congestion, speed, bandwidth, required Quality of Service (QoS), application specifications for which wireless mesh network 302 is utilized, etc.) and the filtering policies and rules applied that resulted in those KPIs.

In some cases, the neural network 610 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 610, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 610 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 610 can perform a backward pass by determining which inputs (weights) most contributed to the loss of the neural network 610, and can adjust the weights so that the loss decreases and is eventually minimized.

A derivative of the loss with respect to the weights can be computed to determine the weights that contributed most to the loss of the neural network 610. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 610 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 610 can represent any other neural or deep learning network, such as an autoencoder, a deep belief nets (DBNs), a recurrent neural networks (RNNs), etc.

FIG. 7 illustrates a computing system architecture, according to some aspects of the present disclosure. Components of computing system architecture 700 are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache 712 of high-speed memory connected directly with, in close proximity to, or integrated as part of the processor 710. The system 700 can copy data from the memory 715 and/or the storage device 730 to the cache 712 for quick access by the processor 710. In this way, the cache 712 can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device, according to some aspects of the present disclosure. Example network device 800 can be suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A hierarchical method of identifying unauthorized network traffic, the method comprising:
    receiving, at one of a first plurality of nodes of a network and via a Software-Defined Field Area Network (SD-FAN) controller, a configuration that identifies (1) a corresponding first shortest path from the one of the first plurality of nodes to one of a second plurality of nodes in the network for forwarding suspicious network traffic and (2) a corresponding second shortest path from the one of the first plurality of nodes to a third plurality of nodes in the network for routing authorized network traffic, the second plurality of nodes being routers with higher packet inspection capabilities compared to the first plurality of nodes;
    applying, at the one of the first plurality of nodes, a first level of network traffic analysis to identify received network traffic as one of the authorized network traffic or the suspicious network traffic;
    sending, by the one of the first plurality of nodes, the received network traffic over the corresponding second shortest path to a destination if the received network traffic is the authorized network traffic;
    if the received network traffic is the suspicious network traffic, tagging, by the one of the first plurality of nodes, the received network traffic as the suspicious network traffic; and
    sending, by the one of the first plurality of nodes, the suspicious network traffic to the one of the second plurality of nodes over the corresponding first shortest path, the second network node applying a second level of network analysis to the received network traffic to determine if the received network traffic is authorized, unauthorized or remains identified as the suspicious network traffic.

2. The hierarchical method of claim 1, wherein when the one of the second plurality of nodes determines that the received network traffic remains identified as the suspicious network traffic, the one of the second plurality of nodes forwards the received network traffic to one or more of an Aggregation Service Router (ASR) or a Software-Defined (SD) controller associated with the network for further processing.

3. The hierarchical method of claim 2, wherein the suspicious network traffic is forwarded to the ASR or the SD controller via a border router.

4. The hierarchical method of claim 2, wherein the further processing determines whether the suspicious network traffic is authorized or unauthorized.

5. The hierarchical method of claim of claim 1, wherein the first level of network traffic analysis applies a first set of filtering rules to the received network traffic and the second level of network traffic analysis applies a second set of filtering rules to the received network traffic.

6. The hierarchical method of claim 5, wherein the first set of filtering rules are less complex than the second set of filtering rules.

7. The hierarchical method of claim 1, wherein the one of the first plurality of nodes and the one of the second plurality of nodes are configured with respective ones of the first level of network traffic analysis and the second level of network traffic analysis by a Software-Defined (SD) controller communicatively coupled to the network.

8. The hierarchical method of claim 7, wherein the SD controller dynamically updates the first level of network traffic analysis and the second level of network traffic analysis using a trained machine learning model.

9. The hierarchical method of claim 1, wherein the one of the first plurality of nodes identifies the received network traffic as one of the authorized network traffic or the suspicious network traffic based on examination of one or more of a source address, a User Defined Protocol (UDP) port, and a destination address of the received network traffic.

10. The hierarchical method of claim 1, wherein the network has a tree-based topology and is a multi-hop wireless mesh network that utilizes Routing Policy Language (RPL) for traffic routing in the network.

11. A wireless mesh network, comprising:
a first plurality of nodes; and
a second plurality of nodes, wherein
at least one of the first plurality of nodes is configured to,
receive, via a Software-Defined Field Area Network (SD-FAN) controller, a configuration that identifies (1) a corresponding first shortest path from the one at least one of the first plurality of nodes to one of the second plurality of nodes in the network for forwarding suspicious network traffic and (2) a corresponding second shortest path from the at least one of the first plurality of nodes to a third plurality of nodes in the network for routing authorized network traffic, the second plurality of nodes being routers with higher packet inspection capabilities compared to the first plurality of nodes;
apply, a first level of network traffic analysis to identify received network traffic as one of the authorized network traffic or the suspicious network traffic;
send the received network traffic over the corresponding second shortest path to a destination if the received network traffic is the authorized network traffic;
if the received network traffic is the suspicious network traffic, tag the received network traffic as the suspicious network traffic; and
send the suspicious network traffic to one of the second plurality of nodes over the corresponding first shortest path, the second network node applying a second level of network analysis to the received network traffic to determine if the received network traffic is authorized, unauthorized or remains identified as the suspicious network traffic.

12. The wireless mesh network of claim 11, wherein when the one of the second plurality of nodes determines that the received network traffic remains identified as the suspicious network traffic, the one of the second plurality of nodes forwards the received network traffic to one or more of an Aggregation Service Router (ASR) or a Software-Defined (SD) controller associated with the network for further processing to determine whether the suspicious network traffic is authorized or unauthorized.

13. The wireless mesh network of claim 12, wherein the suspicious network traffic is forwarded to the ASR or the SD controller via a border router.

14. The wireless mesh network of claim 11, wherein the first level of network traffic analysis applies a first set of filtering rules to the received network traffic and the second level of network traffic analysis applies a second set of filtering rules to the received network traffic, the first set of filtering rules being less complex than the second set of filtering rules.

15. The wireless mesh network of claim 11, wherein the at least one of the first plurality of nodes and the one of the second plurality of nodes are configured with respective ones of the first level of network traffic analysis and the second level of network traffic analysis by a Software-Defined (SD) controller communicatively coupled to the network.

16. The wireless mesh network of claim 15, wherein the SD controller dynamically updates the first level of network traffic analysis and the second level of network traffic analysis using a trained machine learning model.

17. The wireless mesh network of claim 11, wherein the at least one of the first plurality of nodes identifies the received network traffic as one of the authorized network traffic or the suspicious network traffic based on examination of one or more of a source address, a User Defined Protocol (UDP) port, and a destination address of the received network traffic.

18. The wireless mesh network of claim 11, wherein the network has a tree-based topology and is a multi-hop wireless mesh network that utilizes Routing Policy Language (RPL) for traffic routing in the network.

19. The wireless mesh network of claim 11, wherein each of the first plurality of nodes are one or more of a sensor or an Internet of Things device.

20. The wireless mesh network of claim 11, wherein the one of the second plurality of nodes is a network fog device.

* * * * *